April 26, 1949.                    E. J. SCOFIELD                    2,468,378
                         HYDRAULICALLY OPERATED LOADER
                             ATTACHMENT FOR TRACTORS
Filed March 19, 1947                                          6 Sheets-Sheet 1

INVENTOR.
Emory J. Scofield.
BY
Fishburn + Mullendore.
ATTORNEYS

April 26, 1949.

E. J. SCOFIELD 2,468,378

HYDRAULICALLY OPERATED LOADER
ATTACHMENT FOR TRACTORS

Filed March 19, 1947

INVENTOR.
Emory J. Scofield.
BY
Fishburn + Mullendore
ATTORNEYS.

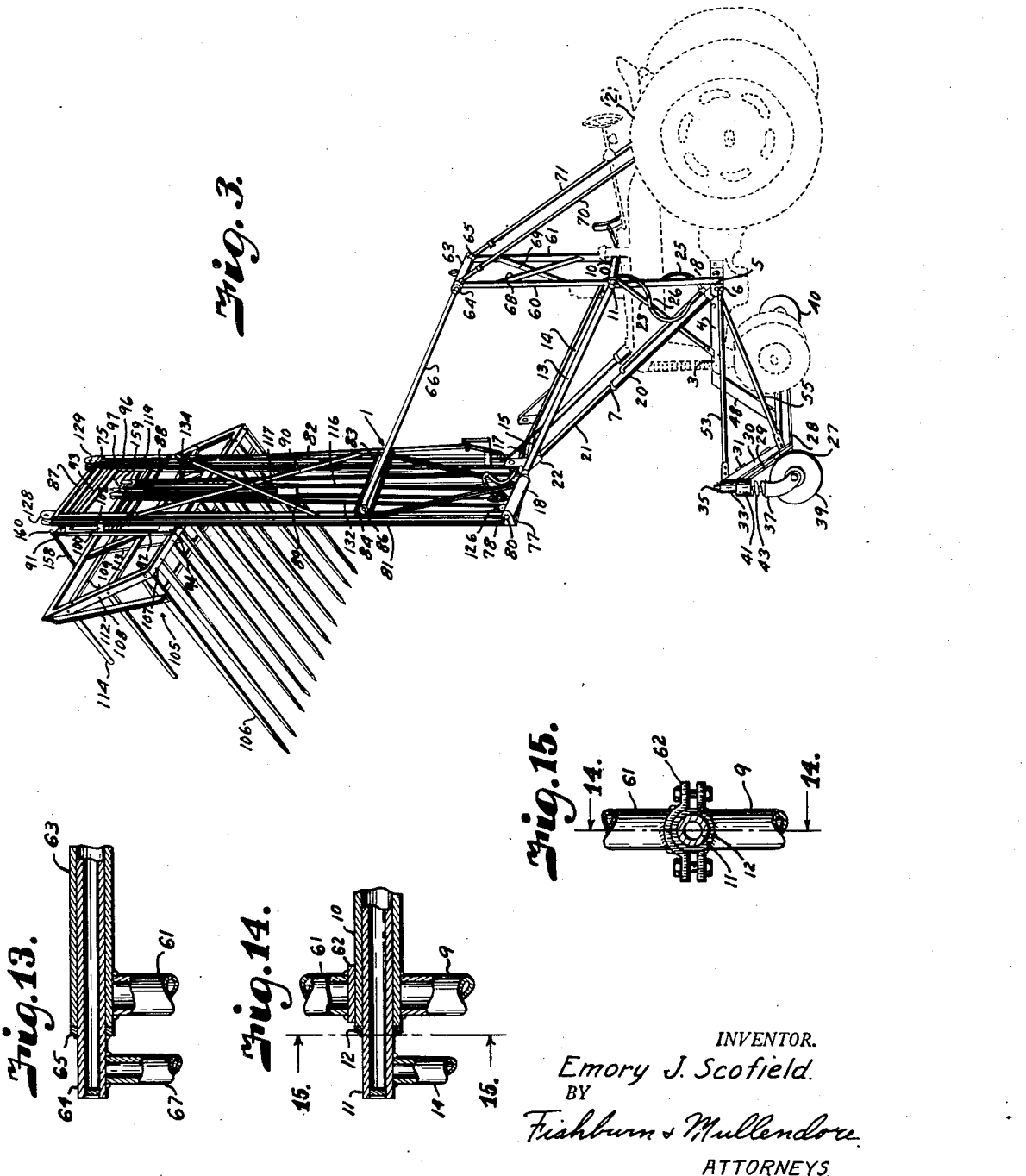

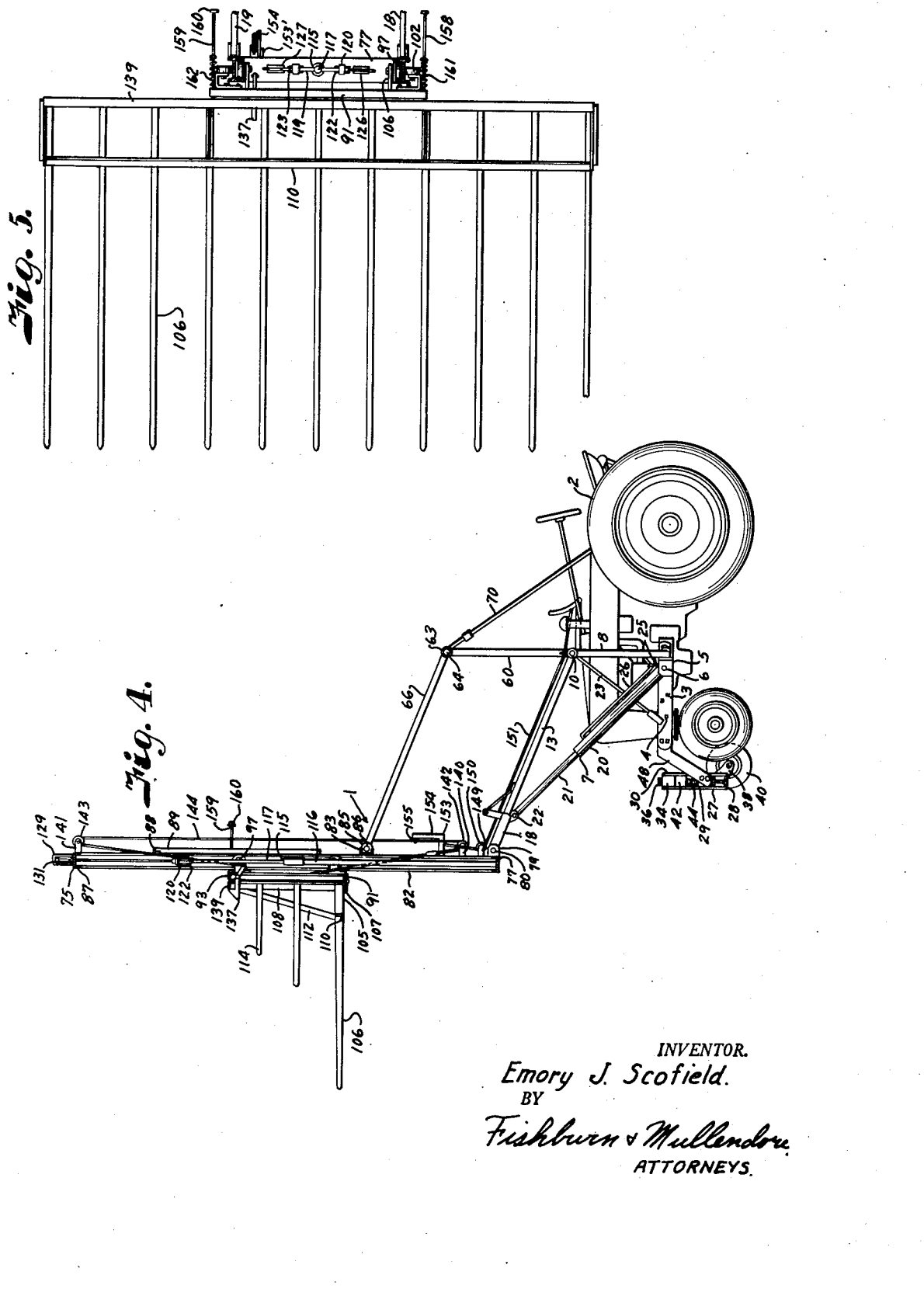

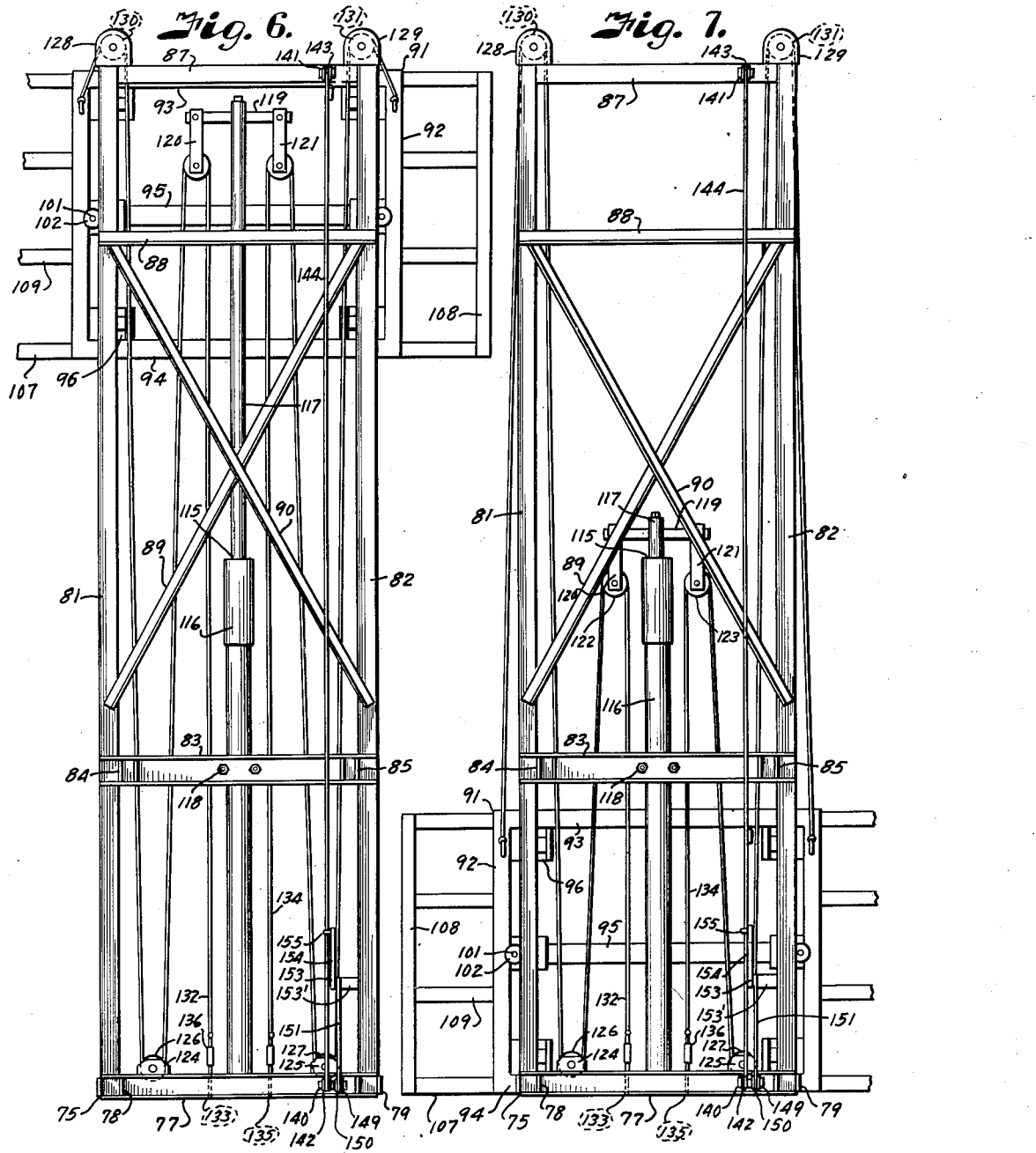

April 26, 1949.  E. J. SCOFIELD  2,468,378
HYDRAULICALLY OPERATED LOADER
ATTACHMENT FOR TRACTORS
Filed March 19, 1947  6 Sheets-Sheet 6
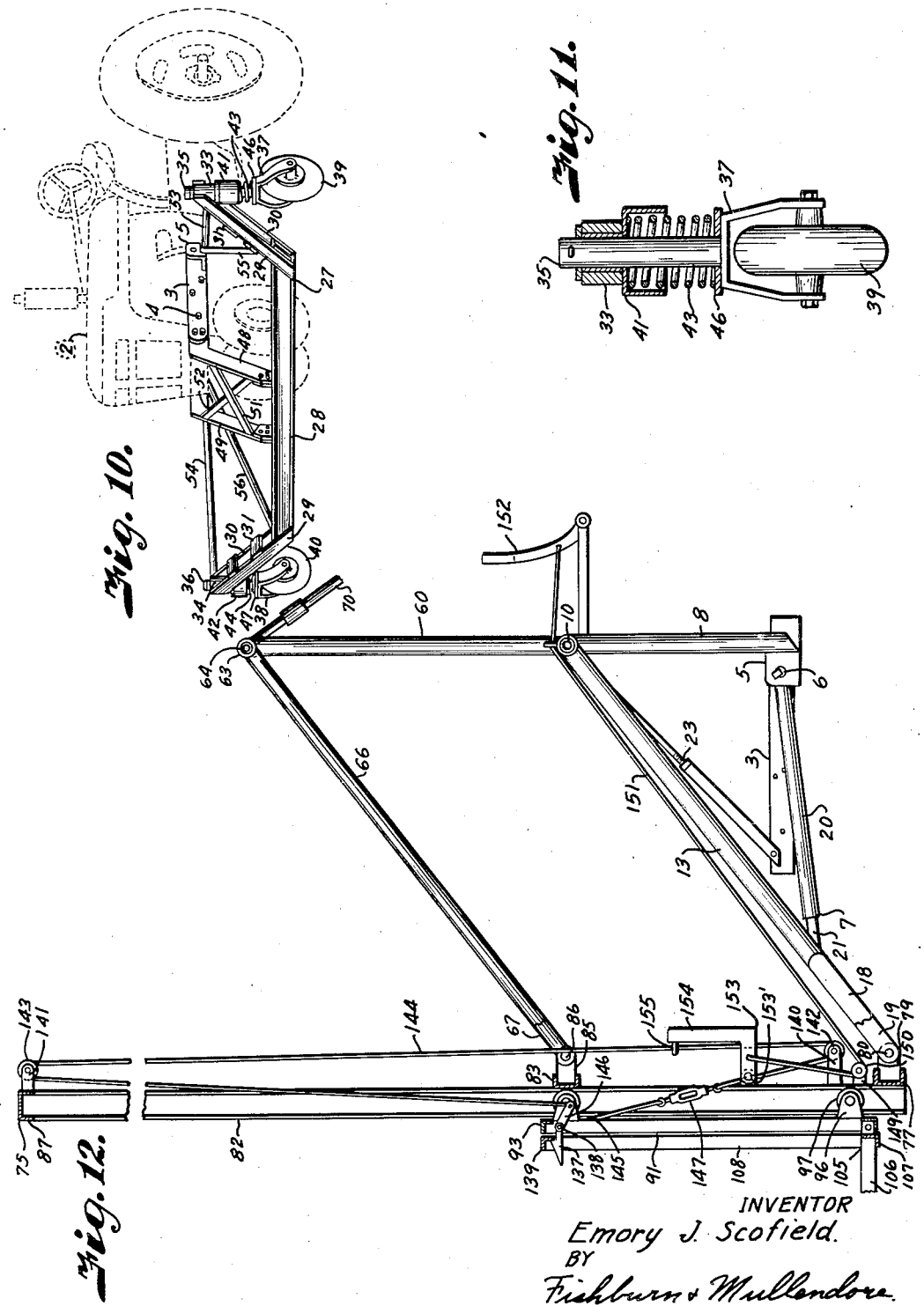
INVENTOR
Emory J. Scofield.
BY
Fishburn & Mullendore
ATTORNEYS.

Patented Apr. 26, 1949

2,468,378

UNITED STATES PATENT OFFICE 2,468,378

HYDRAULICALLY OPERATED LOADER ATTACHMENT FOR TRACTORS

Emory J. Scofield, Ottawa, Kans., assignor to Ottawa Steel Products, Inc., Ottawa, Kans., a corporation of Kansas Application March 19, 1947, Serial No. 735,623

17 Claims. (Cl. 214—113)

This invention relates to a device for gathering and stacking or loading material such as hay and the like, and is particularly adaptable to be attached to a tractor or other mobile unit.

The principal objects of the present invention are to provide a device of this character which may be quickly and easily attached to and removed from the ordinary farm tractor and which is exceptionally mobile and adaptable to handle large quantities of materials in an orderly and facile manner; to provide a device of this character in which the operations of picking up, carrying and elevating the load and then depositing the load are easily and conveniently controlled by tractor powered hydraulically operated means; to provide a device of this character embodying means for conveniently controlling all of the operations necessary and in use from the driver's seat of the tractor; to provide a device of this character capable of a very high lift in order to elevate the load to the desired height in a stacking operation; to provide a wheel supporting structure attached to the main frame of the device to lend rigidity to the structure; to provide a vertical framework structure having trackways at the forward end of the main frame structure; to provide a carriage slidable on the vertical trackways to which is pivotally attached a load carrying device, such as a hay basket, for guiding the load carrying means upwardly to the desired elevation; to provide a vertically extending hydraulic cylinder for raising and lowering said carriage and the load carrying means on the vertical track; to provide means for operating said cylinder independently of the main cylinders for raising and lowering said carriage and load carrying means on said trackways; to provide means for latching said load carrying means in load lifting position and for releasing the load at the desired elevation; and to provide a device of this character simple, economical to manufacture and efficient in operation.

Further objects of the present invention are to provide a superstructure adapted to engage and be attached to the main frame of the loader having radius rods attached to the vertical trackways to operate in parallel movement with the load lifting arms of the main frame to provide a rigid support for the vertical framework.

In accomplishing these and other objects of the present invention I have provided improved details of structure, the preferred form of which is illustrated in the accompanying drawings, wherein:

Fig. 3 is a perspective view of my invention attached to a tractor showing the hay basket elevated and in load releasing position.

Fig. 4 is a longitudinal cross-section through the device showing the hay basket in partly elevated position.

Fig. 5 is a cross-sectional view taken on the line 5—5, Fig. 4.

Fig. 6 is a rear elevational view of the vertical tracks and hydraulic cylinders for raising the hay basket and showing the hay basket in elevated position.

Fig. 7 is a view similar to Fig. 6 showing the hay basket in lowered position.

Fig. 8 is a rear elevational view particularly illustrating the frame mounting for the guide sheaves of the cable for elevating the hay basket.

Fig. 9 is an elevational view particularly illustrating the guide sheaves with relation to the tracks.

Fig. 10 is a perspective view of the dolly frame and its attachment to the tractor for additional support of the loader attachment.

Fig. 11 is a vertical cross-section through one of the dolly wheels and its mounting.

Fig. 12 is a vertical section on a line 12—12, Fig. 7.

Fig. 13 is a sectional view showing the pivoting of the arms of the super-frame structure.

Fig. 14 is a sectional view of the load lifting arm frame structure taken on a line 14—14, Fig. 15.

Fig. 15 is a transverse sectional view of said structure taken on a line 15—15, Fig. 14.

Figure 1:
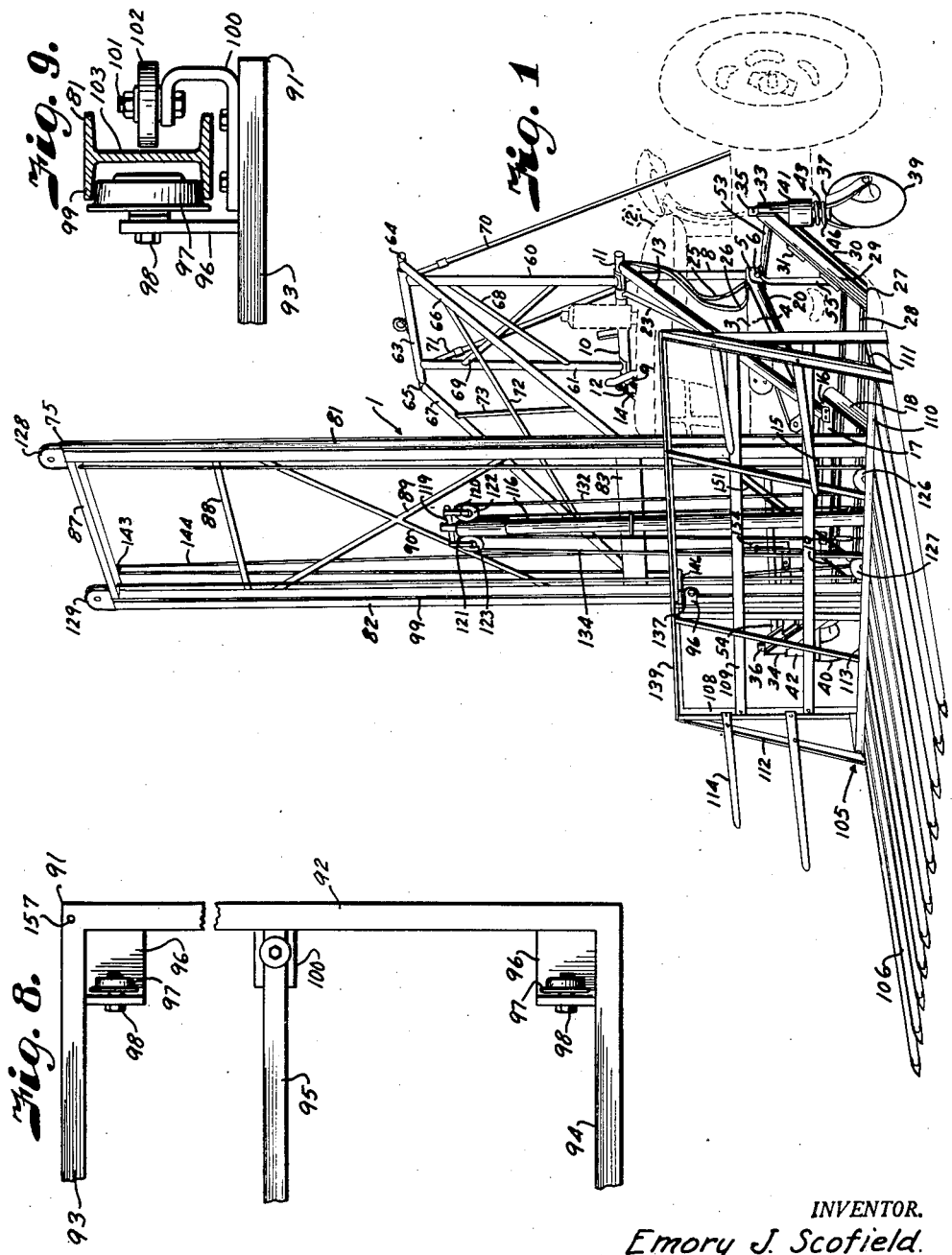
Fig. 1 is a perspective view of my invention attached to a tractor showing the hay basket in lowered position.
Figure 2:
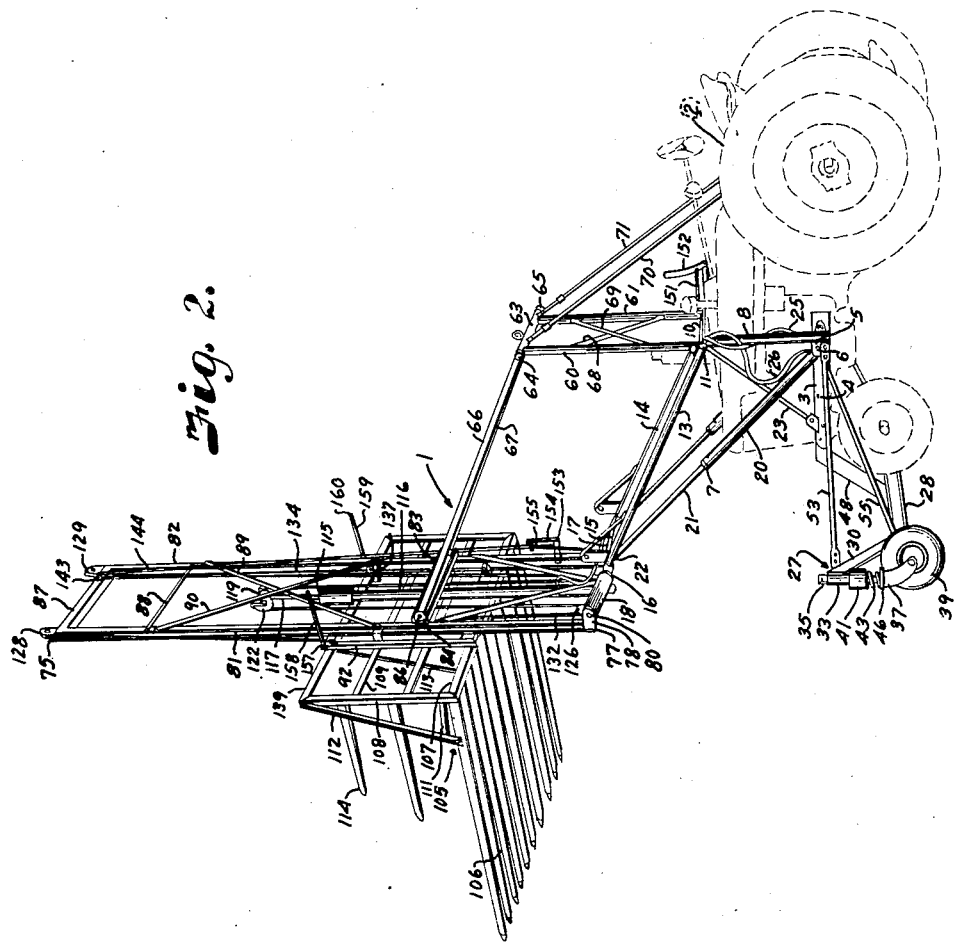
Fig. 2 is a perspective view of my invention attached to a tractor showing the hay basket in partly elevated position.

Referring more in detail to the drawings:

1 designates a loader embodying the features of my invention adapted to be attached to a tractor shown in dotted lines as indicated at 2. The device consists of a main frame having side rails 3 adapted to be attached to the body or framework of the tractor by bolts or the like as indicated at 4 (Fig. 10). The side rails 3 are of such length that they extend from the front of the frame of the tractor to substantially midway thereof to afford a rigid support to the structure and sufficient bracing against endwise thrust as transmitted by the action of the power lifting means during working operation of the device. Brackets 5 are welded or otherwise suitably secured to the rear of the side rails 3, to which are pivotally mounted by bolts or the like 6 hydraulic jacks or actuators extending forwardly of the frame and adapted for up and down swinging movement at their forward ends. Rigidly secured to the rear side of the brackets 5 and to the side rails 3 are uprights 8 and 9 which extend to slightly above the engine of the tractor, and rigidly secured to the upper ends of said uprights is a tubular cross bar 10 having its outer ends extending slightly outwardly from the upright members. A tubular member 11 is adapted to engage in the tubular cross bar 10, the tubular bar 10 forming a bearing for the tubular member 11. The respective ends of the tubular member 11 extend outwardly of the tubular bearing 10. Washers 12 are welded to the member 11 to bear against the ends of the tubular cross bar 10. Rigidly mounted on the outer ends of the member 11 are load lifting arms 13 and 14 which extend forwardly of the tractor and are rigidly connected at their forward ends by a cross bar 15. Rigidly connected to the forward ends of the load lifting arms 13 and 14 is a yoke 16 comprising a transverse bar 17 having forwardly extending bails 18 and 19 for a purpose later described.

The hydraulic jacks comprise cylinders 20 and plungers 21, and the forward ends of the plungers are pivotally connected to the cross bar 15 at the forward ends of the load lifting arms 13 and 14, as indicated at 22 (Fig. 4). Braces 23 extend diagonally between the forward portions of the frame rails 3 and the cross bar 10 to provide a rigid structure for the uprights with respect to the frame.

A pump and fluid supply tank are carried by the tractor and the pump is operated by the motor of the tractor for conducting the fluid from the tank through supply and return lines 25 and 26 leading to and from the cylinders 20 for extending the plungers for raising and lowering the radius arms.

In order to relieve the forward portion of the tractor and particularly the small guiding wheels thereof of a portion of the weight of the loading device and to provide stability to the device and the forward end of the tractor to prevent tipping thereof in a fore, aft or sidewise direction, particularly when a load thereon is in elevated position, I provide a dolly arrangement as illustrated in Fig. 10. The dolly comprises a frame 27 consisting of an axle 28, preferably of I-beam construction. The axle 28 is provided with outwardly and upwardly diverging ends consisting of members 29 and 30 and cross braces 31 carrying steering knuckle bearings 33 and 34. Journalled in the bearings 33 and 34 are king pins 35 and 36 carrying forks 37 and 38 to which are rotatably mounted ground wheels 39 and 40. Surrounding the king pins 35 and 36 and adapted to engage against the lower ends of the bearings 33 and 34 are housings 41 and 42 and which are adapted to engage one end of coil springs 43 and 44 surrounding the king bolts and having their lower ends engaging against plates 46 and 47 on the upper ends of the forks 37 and 38.

Attached to the forward ends of the tractor frame and underneath the side rails 3 of the loader attachment are bars 48 and 49 having their forward ends extending downwardly and rigidly secured to upwardly extending arms which are in turn rigidly attached to the axle 28 substantially in front of the front wheels of the tractor as best illustrated in Fig. 10. The bars 48 and 49 are supplied with cross braces 51 and 52.

Braces 53 and 54 are provided on each side of the tractor and having their rear ends engaging the brackets 5 attached to the side rails 3 and their forward ends attached to the upper portion of the outwardly converging members 30 of the axle member. The structure is also provided with braces 55 and 56 extending from the brackets 5 to the lower portion of the outwardly converging members 30 to provide a rigid structure of the dollies and prevent excessive sidewise tilting of the tractor and loading attachment.

The super-frame structure of the loading attachment now to be described is particularly adapted for attachment to the main frame and load lifting arms as previously described, and consists of uprights 60 and 61 having their lower ends rigidly secured to the tubular cross bar 10 above the tractor by clamps 62, the clamps being welded to the uprights 8—9 and 60—61 respectively, as illustrated in Fig. 15. A tubular cross bar 63 is rigidly secured to the top of the uprights 60 and 61, forming a bearing for a tubular member 64. The tubular member is held in place in the bearing member 63 by washers 65 welded to the member 64. The operation of this structure is substantially similar to that of the tubular cross bar 10 and tubular member 11 of the main frame structure and operates in unison as will later be described. Guide rods 66 and 67 are rigidly attached to the outer ends of the tubular member 64 and extend forwardly and substantially parallel with the load lifting arms 13 and 14 of the main structure. These guide rods are substantially the same length as the load lifting arms including the bails 18 and 19 of the yoke member 16. Cross braces 68 and 69 are provided for the uprights 60 and 61, and rods or braces 70 and 71 are attached to the cross bar 63 and extend rearwardly and are secured to the axle of the tractor by any suitable manner to provide rigidity to the upright structure. Cross braces 72 and 73 are also provided for the guide rods as best illustrated in Fig. 1.

A vertical guide track or column 75 is provided to be supported from the forward ends of the radius arms 13 and 14 and guide rods 66 and 67. The vertical column comprises a base 77 consisting of a channel or I-beam member having rearwardly extending ears 78 and 79 adapted to be pivotally engaged to the forward ends of the bails 18 and 19 of the load lifting arms by pins 80 (Fig. 4). Rigidly secured to the base 77 by welding or the like are I-beams 81 and 82 or other suitable track forming members extending vertically in front of the frame. Secured to the I-beams is a channel member 83 having rearwardly extending ears 84 and 85 to which the forwardly extending guide rods 66 and 67 are pivotally attached by pins 86 (Fig. 4), the axis of the pins 86 being substantially the same distance from the axis of the pin 80 as the spacing of the pivot points of the radius arms 13 and 14 on the trunnions 11 and 12 and the pivot point of the arms 66 and 67 on the trunnions 64 and 65. This pivotal arrangement of the I-beams provides a parallel motion in the raising of the lifting arms 13 and 14 and the guide rods 66 and 67 so that the vertical guide track 75 will move upwardly when the plungers 21 of the hydraulic jacks 7 are extended forwardly.

The upper ends of the I-beams 81 and 82 preferably are rigidly secured to a cross member 87 consisting of a channel or other suitable structural member for maintaining the I-beams in substantially parallel relation. Spaced downwardly from the cross member 87 is a cross arm 88 and diagonal braces 89 and 90 which tend to add rigidity to the column and maintain the I-beams in parallel relation.

A carriage 91 is adapted to be raised and lowered on the column 75 and comprises side rails 92, a top rail 93, bottom rail 94 and a cross brace 95. The carriage is slightly wider than the I-beams 81 and 82 of the vertical column and in the respective four corners of the frame 91 of the carriage are brackets 96 adapted to carry rollers 97 rotatably mounted on bolts or the like 98. The rollers 96 are adapted to engage the flanges 99 of the I-beams 81 and 82 as best illustrated in Fig. 9.

The cross brace 95 is also provided with brackets 100 on each end thereof upon which are mounted by bolts or the like 101 rollers 102 adapted to engage the outer face of the web 103 of the I-beams also as best illustrated in Fig. 9. This arrangement of rollers provides for easy movement of the carriage upwardly and downwardly on the I-beams and prevents their removal as well as for holding the carriage on the tracks of the vertical column.

A basket 105 is pivotally mounted on the bottom rail 94 of the carriage in any suitable manner and comprises a series of transversely spaced and longitudinally extending fingers or rake pieces 106 which are secured at rear ends to a transversely arranged sill member 107. The length of the basket 105 is preferably greater than the width of the tractor and comprises a back consisting of side posts 108 and a plurality of cross members 109. A cross bar 110 secured to the fingers 106 is spaced from and parallel with the sill member 107 and has side rails 111 extending rearwardly therefrom and fastened to the uprights 108 as best illustrated in Fig. 1. Forwardly extending side braces 112 are secured to the outside of the uprights 108 and to the outer fingers of the basket and spaced braces 113 have their respective ends secured to the top rail of the basket and to the cross bar 110, also as best illustrated in Fig. 1, to lend rigidity to the structure. A plurality of side fingers 114 are provided on each side of the basket to prevent hay or other material from sliding off the rear of the basket. I do not wish to be limited to the particular form of basket described as it will be obvious other forms may be used.

A hydraulic jack 115 extends vertically substantially midway between the jacks 81 and 82 of the column and has its lower end rigidly secured to the base member 77. The jack comprises a cylinder 116 having a plunger 117 adapted to be extended from the cylinder by fluid pressure as will later be described. The cylinder 116 is rigidly secured to the cross brace 83 by U-bolts or the like 118.

Rigidly secured to the upper end of the plunger 117 is a cross member 119 having depending brackets 120 and 121 on its outer end adapted to carry sheaves or pulleys 122 and 123. Mounted on the base member 77 of the column in brackets or the like 124 and 125 are sheaves or pulleys 126 and 127. Extending upwardly from the top of the tracks 81 and 82 are brackets 128 and 129 adapted to support sheaves or pulleys 130 and 131. A cable 132 is provided having one end secured to the base 77 as indicated at 133 (Fig. 6) and the cable is then run over pulley 122 back to pulley 126 and over pulley 130 and has its opposite end secured to the side rail 92 of the carriage 91 as illustrated in Figs. 5 and 6. A cable 134 having one end secured to the base 77 as indicated at 135 is run over the pulley 123, through pulley 127 and over pulley 131 and has its opposite end also secured to the opposite side rail 92 of the carriage 91. These cables are in tension and if desired, turnbuckles 136 or other suitable means may be provided for providing the proper tension on the cables.

When fluid pressure is applied to the cylinder, the plunger will be extended from the cylinder as illustrated in Fig. 6 and as the plunger rises, the cables will be extended upwardly through the pulleys 122 and 123 and as the ends of the cables are attached to the carriage, the carriage will be raised on the I-beam tracks to the top of the column. Release of pressure will allow the plunger to be lowered in the cylinder and the carriage lowered on the track.

As the basket or load carrying member is pivotally secured to the lower portion of the carriage 91, the basket will, of course, be raised and lowered with the carriage. In order to facilitate removal of the material from the basket, the basket is pivoted forwardly as shown in Fig. 3 of the drawings, and when it is in loading position it is held rigidly to the carriage by latching mechanism which consists of a latch 137 pivotally mounted on the top cross bar 93 of the carriage by bolts or the like 138, the latch 137 being adapted to engage the transverse cross bar 139 of the basket 105. A bracket 140 is secured to the lower portion of the track 82 of the column and a bracket 141 is secured to the upper end thereof adapted to support pulleys 142 and 143 over which is run a cable 144 having one end secured to the carriage 91 as indicated at 145, and its opposite end secured to a lever 146 rigidly secured to the latch 137. Tension is supplied to the cable by a turnbuckle or the like 147. Also secured to the bottom of the track 82 is a bracket 149 supporting a pulley 150 for accommodating a cable 151 leading to a lever 152 for manipulation by the operator of the tractor. Also carried by the track 82 is a bracket 153' upon which is pivotally mounted a lever 153.

The lever 153 has an arm 154 carrying a loop or ring 155 through which the cable 144 passes. Manipulation of the lever 152 will cause outward tension on the lever arm 154 to tension the cable 144 causing upward lift on the arm 146 to release the latch 137 from the transverse cross bar of the basket, allowing the basket to tilt forwardly as illustrated in Fig. 3.

In order to cushion and limit the drop of the basket, I preferably provide apertures or eyes 157 adjacent the top of the side members 92 of the carriage 91 adapted to receive rods or the like 158 and 159 having heads 160 on their outer ends and their inner ends being secured in any suitable manner to the transverse top cross bar 139 of the basket 105. Coil springs 161 and 162 are provided on the rods 158 and 159 so that when the basket tilts forwardly, the rods will slide through the eyes 157. The heads will engage the outer ends of the coil springs to cushion the impact and limit the tilting movement of the basket. In order for the basket to assume the loading latched position it is only necessary to lower the same to the ground and when the fingers of the basket assume a horizontal position, the latch 137 will again engage the transverse top cross bar 139 of the basket.

Operation of a device constructed and assembled as described is as follows:

With the device in loading position and the basket supported near the ground with the fingers 106 forwardly directed to rake up the mown hay or other material as the tractor travels forwardly over the ground, the hay or other material will build up on the basket and when it is full, the column comprising the vertical tracks and carriage may be raised by fluid pressure behind the plungers 21 of the cylinders 20 to extend the plungers outwardly, thus raising the load lifting arms 13 and 14. Simultaneously therewith the column 75 will be lifted, the guide rods 66 and 67 holding the column in upright position and such rods being of the same length as the load lifting arms will cause the raising thereof in parallel relation to the lifting arms. Fluid pressure is admitted to the cylinders 20 by the pump and line (not shown) through manipulation of a valve lever (also not shown).

When the cylinders 20 with their plungers 21 are extended to their fullest extent and further lifting of the load is desired, fluid medium is supplied through line 163 from a supply tank (not shown) through manipulation of the valve lever (also not shown), the line having engagement with the lower end of the vertical cylinder 116, and supply of the fluid medium to the cylinder will cause the plunger 117 to be extended upwardly from the cylinder and the plunger carrying the cables 132 and 134 over pulleys 122 and 123 will cause the carriage 91 to be raised upwardly on the vertical trackways comprising the I-beams 81 and 82, and as the basket 105 is attached to the carriage it with its load will be raised simultaneously therewith to the desired height. The load may be released from the basket by manipulation of the lever 152 of the operator of the tractor through the cable 151 leading to the lever 153, thereby tightening the cable 144 to release the latch 137 from the bar 139 of the basket so that the basket will pivot on the carriage to release the load therefrom. Release of pressure on the vertical cylinder will allow the carriage to assume its lower position in the trackways, and release of pressure on the cylinders alongside the tractor frame will allow the load lifting arms to be lowered, as well as the vertical framework structure.

It will be obvious from the foregoing that I have provided an improved hydraulically operated tractor mounted loading attachment for the handling of material such as hay or the like.

It will further be obvious that hay loaders and stackers having physical characteristics different from those illustrated and described may be made without departing from the spirit of the invention or scope of the appended claims.

What I claim and desire to secure by Letters Patent is:

1. In a hydraulically operated loader attachment for tractors having a frame secured to the tractor and including load lifting arms pivotally connected to said frame and extending forwardly of the tractor, a frame mounted on the forward ends of said arms and extending vertically above said tractor, load carrying means operatively and slidably mounted on the vertical frame, hydraulic actuators pivotally mounted on the first named frame and having their forward ends pivotally connected to said load lifting arms for raising and lowering said arms and said vertical frame, and means carried by the vertical frame for raising and lowering the load carrying means on said vertical frame.

2. In a hydraulically operated loader attachment for tractors having a frame secured to the tractor and including load lifting arms pivotally connected to said frame and extending forwardly of the tractor, a frame mounted on the forward ends of said arms and extending vertically above said tractor, load carrying means operatively and slidably mounted on the vertical frame, hydraulic actuators pivotally mounted on the first named frame and having their forward ends pivotally connected to said load lifting arms for raising and lowering said arms and said vertical frame, a hydraulic actuator carried by the vertical frame on said arms and operatively connected to said load carrying means for raising and lowering the load carrying means on said vertical frame, and a sub-frame secured to the forward end of the main frame, said sub-frame having dollies spaced outwardly from the front of the tractor to prevent tilting of the vertical frame when the load carrying means is in elevated position.

3. In a hydraulically operated loader attachment for tractors having a frame rigidly secured to the tractor and including load lifting arms pivotally connected to said frame and extending forwardly of the tractor, a frame pivotally mounted on the forward ends of said arms and extending vertically above said tractor, load carrying means operatively and slidably mounted on the vertical frame, hydraulic actuators pivotally mounted on the first named frame and having their forward ends pivotally connected to said load lifting arms for raising and lowering said arms and said vertical frame, and a hydraulic actuator carried by the vertical frame on said arms and operatively connected to said load carrying means for raising and lowering the load carrying means on said vertical frame.

4. In a hydraulically operated loader attachment for tractors having a frame secured to the tractor and including load lifting arms pivotally connected to said frame and extending forwardly of the tractor, a frame mounted on the forward ends of said arms and extending vertically above said tractor, means connected to the first named frame and to the vertical frame for rigidly supporting the last named frame in vertical position, load carrying means operatively and slidably mounted on the vertical frame, hydraulic actuators pivotally mounted on the first named frame and having their forward ends pivotally connected to said load lifting arms for raising and lowering said arms and said vertical frame, and a hydraulic actuator carried by the vertical frame on said arms and operatively connected to said load carrying means for raising and lowering the load carrying means on said vertical frame.

5. In a hydraulically operated loader attachment for tractors having a frame rigidly secured to the tractor and including a boom pivotally mounted to an upper portion of said frame and extending forwardly of the tractor, a frame mounted on the forward end of said boom and extending vertically above said tractor, load carrying means operatively and slidably mounted on the vertical frame, hydraulic actuators having their rear ends pivotally mounted to a lower portion of the first named frame and having their forward ends pivotally connected to said boom for raising and lowering said boom and said vertical frame, a frame rigidly supported on the first named frame and extending vertically thereabove, said last named frame having forwardly extending arms pivotally connected to said vertical frame carried by the boom, and means carried by the first named vertical frame for raising and lowering the load carrying means on said vertical frame.

6. In a hydraulically operated loader attachment for tractors having a frame secured to the tractor and including load lifting arms pivotally connected to said frame and extending forwardly of the tractor, a frame mounted on the forward ends of said arms and extending vertically above said tractor, load carrying means operatively and slidably mounted on the vertical frame, hydraulic actuators having their rear ends pivotally mounted on the first named frame and having their forward ends pivotally connected to said load lifting arms for raising and lowering said arms and said vertical frame, a frame rigidly mounted on said first named frame and extending vertically thereabove, said last named frame having forwardly extending arms with their forward ends pivotally connected to said vertical frame carried by the load lifting arms, said arms being parallel to the load lifting arms upon raising and lowering of said arms, and means carried by the vertical frame on said arms for raising and lowering the load carrying means on said vertical frame.

7. In a hydraulically operated loader attachment for tractors having a frame secured to the tractor and including load lifting arms pivotally connected to said frame and extending forwardly of the tractor, a frame mounted on the forward ends of said arms and extending vertically above said tractor, load carrying means operatively and slidably mounted on the vertical frame, hydraulic actuators having their rear ends pivotally mounted on the first named frame and having their forward ends pivotally connected to said load lifting arms for raising and lowering said arms and said vertical frame, a frame rigidly mounted on said first named frame and extending vertically thereabove, said last named frame having forwardly extending arms with their forward ends pivotally connected to said vertical frame carried by the load lifting arms, said arms being parallel to the load lifting arms upon raising and lowering of said arms, a hydraulic actuator carried by the vertical frame on said arms and operatively connected to said load carrying means for raising and lowering the load carrying means on said vertical frame, and a sub-frame secured to the forward end of the main frame, said sub-frame having dollies spaced outwardly from the front of the tractor to prevent tilting of the vertical frame when the load carrying means is in elevated position.

8. In a hydraulically operated loader attachment for tractors having a frame secured to the tractor and including load lifting arms pivotally connected to said frame and extending forwardly of the tractor, a frame mounted on the forward ends of said arms and extending vertically above said tractor, said frame including side rails and upper and lower cross bars, the said side rails forming trackways, load carrying means operatively and slidably mounted in said trackways, hydraulic actuators having their rear ends pivotally mounted on the first named frame and having their forward ends pivotally connected to said load lifting arms for raising and lowering said arms and said vertical frame, a hydraulic actuator having its lower end mounted on said lower cross bar of said vertical frame and having a plunger adapted to be extended from said actuator, said plunger having a cross arm on its upper end, pulleys mounted on said cross arm, pulleys mounted on the lower cross bar of said vertical frame, and cables having one of their ends secured to the lower portion of said vertical frame, said cables engaging the pulleys on the lower cross bar and the pulleys on the cross arm of the plunger of the hydraulic actuator and their opposite ends secured to said load carrying means, whereby the load carrying means will be elevated on said vertical frame upon actuation of the plunger in the hydraulic actuator.

9. In a hydraulically operated loader attachment for tractors having a frame rigidly secured to the tractor and including a boom pivotally mounted to an upper portion of said frame and extending forwardly of the tractor, a frame mounted on the forward end of said boom and extending vertically above said tractor, a carriage slidably mounted in the vertical frame, load carrying means attached to said carriage, hydraulic actuators having their rear ends pivotally mounted to a lower portion of the first named frame and having their forward ends pivotally connected to said boom for raising and lowering said boom and said vertical frame, a frame rigidly supported on the first named frame and extending vertically thereabove, said last named frame having forwardly extending arms pivotally connected to said vertical frame carried by the boom, and means carried by the first named vertical frame for raising and lowering the carriage and load carrying means on said vertical frame.

10. In a hydraulically operated loader attachment for tractors having a frame rigidly secured to the tractor and including a boom pivotally mounted to an upper portion of said frame and extending forwardly of the tractor, a frame mounted on the forward end of said boom and extending vertically above said tractor, a carriage slidably mounted in the vertical frame, load carrying means attached to said carriage, hydraulic actuators having their rear ends pivotally mounted to a lower portion of the first named frame and having their forward ends pivotally connected to said boom for raising and lowering said boom and said vertical frame, a frame rigidly supported on the first named frame and extending vertically thereabove, said last named frame having forwardly extending arms pivotally connected to said vertical frame carried by the boom, and a hydraulically operated cylinder carried by the first named vertical frame and operatively connected to said carriage for raising and lowering the carriage and load carrying means on said vertical frame.

11. In a hydraulically operated loader attachment for tractors having a frame secured to the tractor and including load lifting arms pivotally connected to said frame and extending forwardly of the tractor, a frame mounted on the forward ends of said arms and extending vertically above said tractor, a carriage slidable in said vertical frame, load carrying means operatively attached to said carriage, hydraulic actuators having their rear ends pivotally mounted on the first named frame and having their forward ends pivotally connected to said load lifting arms for raising and lowering said arms and said vertical frame, a frame rigidly mounted on said first named frame and extending vertically thereabove, said last named frame having forwardly extending arms with their forward ends pivotally connected to said vertical frame carried by the load lifting arms, said arms being parallel to the load lifting arms, and means carried by the vertical frame on said arms for raising and lowering the carriage and load carrying means on said vertical frame.

12. In a hydraulically operated loader attachment for tractors having a frame secured to the tractor and including load lifting arms pivotally connected to said frame and extending forwardly of the tractor, a frame mounted on the forward ends of said arms and extending vertically above said tractor, a carriage slidably mounted on the vertical frame, a basket pivotally attached to said carriage, hydraulic actuators having their rear ends pivotally mounted on the first named frame and having their forward ends pivotally connected to said load lifting arms for raising and lowering said arms and said vertical frame, a frame rigidly mounted on said first named frame and extending vertically thereabove, said last named frame having forwardly extending arms with their forward ends pivotally connected to said vertical frame carried by the load lifting arms, said arms being parallel to the load lifting arms, a hydraulic actuator carried by the vertical frame on said arms and operatively connected to said carriage for raising and lowering the carriage and load carrying means on said vertical frame, and means for pivoting the basket on the carriage to release the load from the basket.

13. In a hydraulically operated loader attachment for tractors having a frame secured to the tractor and including load lifting arms pivotally connected to said frame and extending forwardly of the tractor, a frame mounted on the forward ends of said arms and extending vertically above said tractor, said frame including side rails and upper and lower cross bars, the said side rails forming trackways, a carriage slidable in said trackways, load carrying means pivotally attached to said carriage, hydraulic actuators having their rear ends pivotally mounted on the first named frame and having their forward ends pivotally connected to said load lifting arms for raising and lowering said arms and said vertical frame, a hydraulic actuator having its lower end mounted on said lower cross bar of said vertical frame and having a plunger adapted to be extended from said actuator, said plunger having a cross arm on its upper end, pulleys mounted on said cross arm, pulleys mounted on the lower cross bar of said vertical frame, and cables having one of their ends secured to the lower portion of said vertical frame and their opposite ends secured to said carriage, said cables engaging over the pulleys on the lower cross bar and the cross arm of the plunger of the hydraulic actuator, whereby the carriage and load carrying means will be elevated on said vertical frame upon actuation of the plunger in the vertical hydraulic actuator.

14. In a hydraulically operated loader attachment for tractors having a frame secured to the tractor and including load lifting arms pivotally connected to said frame and extending forwardly of the tractor, a frame mounted on the forward ends of said arms and extending vertically above said tractor, said frame including side rails and upper and lower cross bars, the said side rails forming trackways, a carriage slidable in said trackways, load carrying means pivotally attached to said carriage, hydraulic actuators having their rear ends pivotally mounted on the first named frame and having their forward ends pivotally connected to said load lifting arms for raising and lowering said arms and said vertical frame, a hydraulic actuator having its lower end mounted on said lower cross bar of said vertical frame and having a plunger adapted to be extended from said actuator, said plunger having a cross arm on its upper end, pulleys mounted on said cross arm, pulleys mounted on the lower cross bar of said vertical frame, cables having one of their ends secured to the lower portion of said vertical frame and their opposite ends secured to said carriage, said cables engaging over the pulleys on the lower cross bar and the cross arm of the plunger of the hydraulic actuator, whereby the carriage and load carrying means will be elevated on said vertical frame upon actuation of the plunger in the vertical hydraulic actuator, and means on said vertical frame and said carriage for pivoting the load carrying means to release the load therefrom.

15. In a hydraulically operated loader attachment for tractors having a frame secured to the tractor and including load lifting arms pivotally connected to said frame and extending forwardly of the tractor, a frame mounted on the forward ends of said arms and extending vertically above said tractor, said frame including said rails and upper and lower cross bars, the said side rails forming trackways, a carriage slidable in said trackways, load carrying means pivotally attached to said carriage, hydraulic actuators having their rear ends pivotally mounted on the first named frame and having their forward ends pivotally connected to said load lifting arms for raising and lowering said arms and said vertical frame, a hydraulic actuator having its lower end mounted on said lower cross bar of said vertical frame and having a plunger adapted to be extended from said actuator, said plunger having a cross arm on its upper end, pulleys mounted on said cross arm, pulleys mounted on the lower cross bar of said vertical frame, cables having one of their ends secured to the lower portion of said vertical frame and their opposite ends secured to said carriage, said cables engaging over the pulleys on the lower cross bar and the cross arm of the plunger, whereby the carriage and load carrying means will be elevated on said vertical frame upon actuation of the plunger in the vertical hydraulic actuator, and a sub-frame structure secured to the forward portion of the first named frame, said structure including dollies on said frame for preventing tilting of the tractor and the vertical frame when the vertical frame is in raised position and to assist in carrying the load on the forward end of the tractor.

16. In a hydraulically operated loader attachment for tractors having a frame secured to the tractor and including load lifting arms pivotally connected to said frame and extending forwardly of the tractor, a frame mounted on the forward ends of said arms and extending vertically above said tractor at the front thereof, said frame including side rails and upper and lower cross bars, the said side rails forming trackways, a carriage slidable in said trackways, load carrying means pivotally attached to said carriage, hydraulic actuators having their rear ends pivotally mounted on the first named frame and having their forward ends pivotally connected to said load lifting arms for raising and lowering said arms and said vertical frame, an inverted U-shaped frame rigidly mounted on said first named frame, radius arms pivotally mounted to the upper portion of the U-shaped frame and to said vertical frame, said arms extending substantially parallel with the load lifting arms, a hydraulic actuator having its lower end mounted on said lower cross bar of said vertical frame and having a plunger adapted to be extended from said actuator, said plunger having a cross arm on its upper end, pulleys mounted on said cross arm, pulleys mounted on the lower cross bar of said vertical frame, and cables having one of their ends secured to the lower portion of said vertical frame and their opposite ends secured to said carriage, said cables engaging over the pulleys on the lower cross bar and on the cross arm of the plunger, whereby the carriage and load carrying means will be raised and lowered upon actuation of the plunger in the vertical hydraulic actuator.

17. In a hydraulically operated loader attachment for tractors having a main frame secured to the tractor and including load lifting arms pivotally connected to said frame and extending forwardly of the tractor, a frame mounted on the forward ends of said arms and extending vertically above said tractor, load carrying means operatively and slidably mounted on the vertical frame, hydraulic actuators pivotally mounted on the main frame and having their forward ends pivotally connected to said load lifting arms for raising and lowering said arms and said vertical frame, means carried by the vertical frame for raising and lowering the load carrying means on said vertical frame, and a sub-frame secured to the forward end of the main frame, said sub-frame having dollies spaced outwardly from the front of the tractor to prevent tilting of the vertical frame when the load carrying means is in elevated position.

EMORY J. SCOFIELD.

REFERENCES CITED

The following references are of record in the file of this patent:

UNITED STATES PATENTS

| Number | Name | Date |
| --- | --- | --- |
| 975,849 | Fulton | Nov. 15, 1910 |
| 2,020,938 | Frank | Nov. 12, 1935 |
| 2,323,605 | Johnson | July 6, 1943 |
| 2,348,899 | Guignard et al. | May 16, 1944 |
| 2,372,870 | Willrodt | Apr. 3, 1945 |
| 2,391,224 | Carter | Dec. 18, 1945 |